UNIVERSAL DECODING MECHANISM

Filed Sept. 21, 1950 9 Sheets-Sheet 1

INVENTOR.
JOHN A. ZENTGRAF
BY
J. L. Sterling
ATTORNEY

INVENTOR.
JOHN A. ZENTGRAF
BY J. L. Sterling
ATTORNEY

UNIVERSAL DECODING MECHANISM

Filed Sept. 21, 1950 9 Sheets-Sheet 3

INVENTOR.
JOHN A. ZENTGRAF

BY J. L. Sterling

ATTORNEY

UNIVERSAL DECODING MECHANISM

Filed Sept. 21, 1950 9 Sheets-Sheet 4

INVENTOR.
JOHN A. ZENTGRAF

BY

ATTORNEY

March 31, 1953 J. A. ZENTGRAF 2,633,491

UNIVERSAL DECODING MECHANISM

Filed Sept. 21, 1950 9 Sheets-Sheet 5

INVENTOR.
JOHN A. ZENTGRAF

BY J. L. Sterling

ATTORNEY

March 31, 1953 J. A. ZENTGRAF 2,633,491

UNIVERSAL DECODING MECHANISM

Filed Sept. 21, 1950 9 Sheets-Sheet 6

INVENTOR.
JOHN A. ZENTGRAF

BY J. L. Sterling

ATTORNEY

March 31, 1953 J. A. ZENTGRAF 2,633,491

UNIVERSAL DECODING MECHANISM

Filed Sept. 21, 1950 9 Sheets-Sheet 7

INVENTOR.
JOHN A. ZENTGRAF

BY [signature]

ATTORNEY

March 31, 1953 J. A. ZENTGRAF 2,633,491

UNIVERSAL DECODING MECHANISM

Filed Sept. 21, 1950 9 Sheets-Sheet 8

INVENTOR.
JOHN A. ZENTGRAF

BY [signature]

ATTORNEY

| CODE TELETYPE | CHARACTER | |
|---|---|---|
| | NO. | LETTER |
| | | |
| | | |
| | | |
| | | |
| | | |
| | | |
| | | |
| I | 3 | E |
| II | LINEFEED | |
| III | SPACE | |
| IV | CAR. RET. | |
| V | 5 | T |
| | | |
| IV-V | 9 | O |
| III-V | £ | H |
| II-V | ) | L |
| I-IV | $ | D |
| | | |
| III-IV | , | N |
| I-III | BELL | S |
| | | |
| II-IV | 4 | R |
| II-III | 8 | I |
| I-II | — | A |
| I-V | " | Z |
| | | |
| | | |
| | | |
| | | |
| | | |
| | | |
| | | |
| | | |
| | | |
| | | |
| I-II-V | 2 | W |
| I-II-IV | ' | J |
| I-II-III | 7 | U |
| II-III-IV | : | C |
| I-III-IV | 1 | F |
| | | |
| II-III-V | 0 | P |
| I-III-V | 6 | Y |
| | | |
| III-IV-V | . | M |
| II-IV-V | & | G |
| I-IV-V | ? | B |
| | | |
| I-II-III-V | ! | Q |
| I-II-III-IV | ( | K |
| I-III-IV-V | / | X |
| II-III-IV-V | ; | V |
| | | |

FIG. 16

| 90 COL. CODE | CHARACTER |
|---|---|
| | |
| | |
| | |
| | |
| | |
| | |
| X | 0 |
| I | 1 |
| III | 3 |
| V | 5 |
| VII | 7 |
| IX | 9 |
| | |
| VII-IX | 8 |
| V-IX | 6 |
| III-IX | 4 |
| I-VII | R |
| X-VII | C |
| V-VII | G |
| I-V | B |
| X-V | M |
| III-VII | H |
| III-V | I |
| I-III | O |
| I-IX | 2 |
| X-I | 37 |
| X-IX | L |
| X-III | E |
| X-III-IX | V |
| X-III-VII | W |
| X-III-V | D |
| X-I-IX | * |
| X-I-VII | * |
| X-I-V | * |
| X-I-III | * |
| I-III-IX | Y |
| I-III-VII | P |
| I-III-V | J |
| III-V-VII | Q |
| I-V-VII | S |
| X-V-VII | U |
| III-V-IX | K |
| I-V-III | A |
| X-V-IX | N |
| V-VII-IX | Z |
| III-VII-IX | T |
| I-VII-IX | F |
| X-VII-IX | X |
| | |
| | |
| | |
| | |
| | |

FIG. 15

| 80 COL. CODE | CHARACTER |
|---|---|
| XII | 12-L |
| XI | 11 |
| IX | 9 |
| VIII | 8 |
| VII | 7 |
| VI | 6 |
| X | 0 |
| I | 1 |
| II | 2 |
| III | 3 |
| IV | 4 |
| V | 5 |
| XII-XI | * |
| X-VI | W |
| X-VII | X |
| X-VIII | Y |
| X-IX | Z |
| X-IV | U |
| | |
| | |
| X-III | T |
| | |
| | |
| | |
| | |
| X-I | * |
| X-V | V |
| X-II | S |
| XI-V | N |
| XI-IV | M |
| XI-III | L |
| XI-IX | R |
| XI-VIII | Q |
| XI-VII | P |
| XI-VI | O |
| XII-V | E |
| XII-IV | D |
| XII-III | C |
| XI-II | K |
| XI-I | J |
| XI-X | * |
| XII-II | B |
| XII-I | A |
| XII-X | * |
| XII-IX | I |
| XII-VIII | H |
| XII-VII | G |
| XII-VI | F |
| | |
| | |
| | |
| | |
| | |

FIG. 14

| 45 COL. CODE | CHARACTER |
|---|---|
| XII | 12-L |
| XI | 11-A |
| IX | 9-K |
| VIII | 8-J |
| VII | 7-I |
| VI | 6-H |
| X | 0-B |
| I | 1-C |
| II | 2-D |
| III | 3-E |
| IV | 4-F |
| V | 5-G |
| XII-XI | M |
| | |
| | |
| | |
| | |
| | |
| | |
| | |
| | |
| | |
| | |
| | |
| | |
| | |
| | |
| | |
| | |
| | |
| | |
| | |
| | |
| | |
| | |
| XII-V | T |
| XII-IV | S |
| XII-III | R |
| | |
| | |
| | |
| XII-II | P |
| XII-I | O |
| XII-X | N |
| XII-IX | Y |
| XII-VIII | X |
| XII-VII | W |
| XII-VI | U |
| | |
| | |
| | |
| | |
| | |

FIG. 13

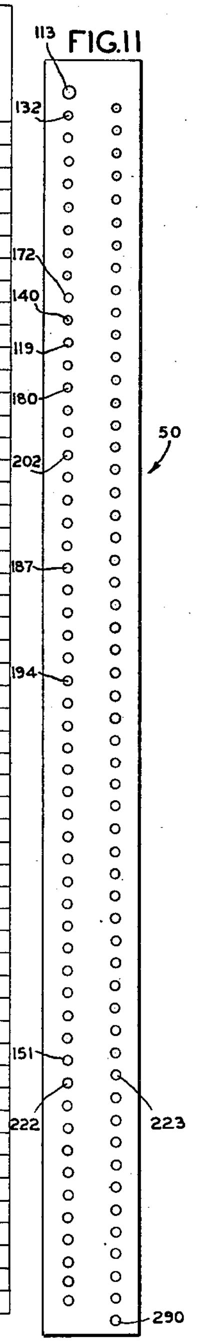
FIG. 11

INVENTOR
JOHN A. ZENTGRAF

BY J. L. Sterling

ATTORNEY

Patented Mar. 31, 1953 2,633,491

UNITED STATES PATENT OFFICE 2,633,491

UNIVERSAL DECODING MECHANISM

John A. Zentgraf, Ardmore, Pa., assignor to Remington Rand Inc., New York, N. Y., a corporation of Delaware Application September 21, 1950, Serial No. 185,917

9 Claims. (Cl. 178—26)

This invention relates generally to electromechanical translating devices, and more specifically to an electromechanical device that will translate any one, two, three, four, or five, digit code into another code of similar or different digits.

Particularly adaptable to the punched-card art, the invention represents a means for reproducing or converting satistical data in the form of coded columnar perforations in a card to columnar perforations of a different code into a second card.

The statistical codes in wide use in commercial business are the Powers and Hollerith codes. These codes consist of twelve or six position, one, two or three digit combinations. They have a separate and distinct combination for each letter of the alphabet and for each numerical representation, and have been primarily designed for operating and controlling machines that will perform accounting and other statistical problems. These statistical codes are not, however, applicable, to the popular intelligence transmitting medium, printing telegraphy, in that said equipment in use throughout the world has been designed for use with the five position Baudot code. The latter code comprises a start-stop system of electrical impulses in various combinations to represent alphabetical or numerical characters. However, the same combinations may represent either an alphabetical or numerical character, depending upon the preceding signal. Therefore, data recorded in the statistical codes must be translated to the Baudot code if such data is to be transmitted over the existing printing telegraphy facilities.

The principal object of this invention resides in the provision that single or plural codes can be translated into different codes.

Another object provides for reproducing a tape record in one code from a card record in a similar or different code, and vice versa.

Still another object provides for reproducing a card in one code from a card having a different code.

Another object provides for reproducing a card in one code from a card having the same code.

A further object provides for reproducing a tape in one code from a tape having a different code.

Another object provides for operating a direct printing machine, such as an electric typewriter, teletypewriter, etc., under control of a punched card or tape.

Another object provides for automatic translation of sensed alphabetical or numerical Baudot code characters.

Other objects and structural details of the invention will be apparent from the following description when read in connection with the accompanying drawings, wherein:

Figs. 1, 2, 3, 4, 5, 6, 7, and 8, together constitute a schematic wiring diagram of the invention;

Fig. 11 is a view of the terminal strip;

Figs. 13, 14, 15, and 16 represent charts of the several codes and their associated characters that may be used in conjunction with the invention.

The invention forms a compact unit which may be universally employed for translating purposes and as a means for controlling many of the present card operated business machines. With reference to the punched card art, because of the high conversion expense, a large amount of small business concerns are still using 45 column records and the equipment associated therewith rather than the more modern and efficient 80 or 90 column records. The simplicity of operation and construction of the herein described invention provides a means whereby users of these restricted systems may, with a minimum of expense, convert to the more efficient systems. The record producing equipment, controlled by the invention, is that which is normally used in performing daily operations, thereby further reducing expense in the use of the converting system. As an example, in converting from 45 column records to 90 column records, the invention, plus an automatic key punch such as that described in Patent 2,124,178 to Lasker, would provide the basis for such conversion. Obviously, the said punch could also be used for producing new records in that a keyboard is available for manual operation thereof.

As will be hereinafter apparent, the invention may be adapted to solve many heretofore difficult commercial problems.

*Card sensing mechanism*

Figure 1:
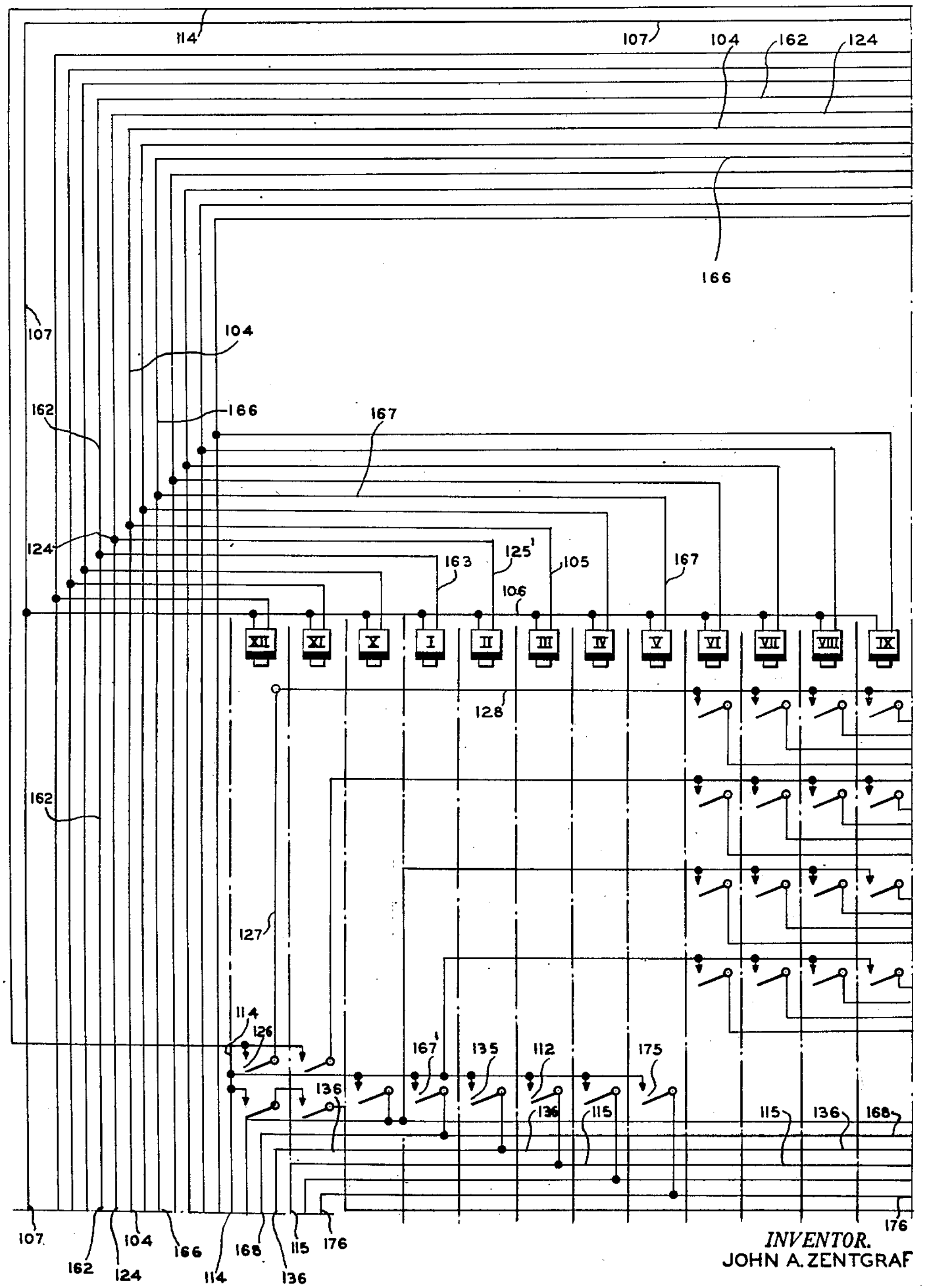
Figure 2:
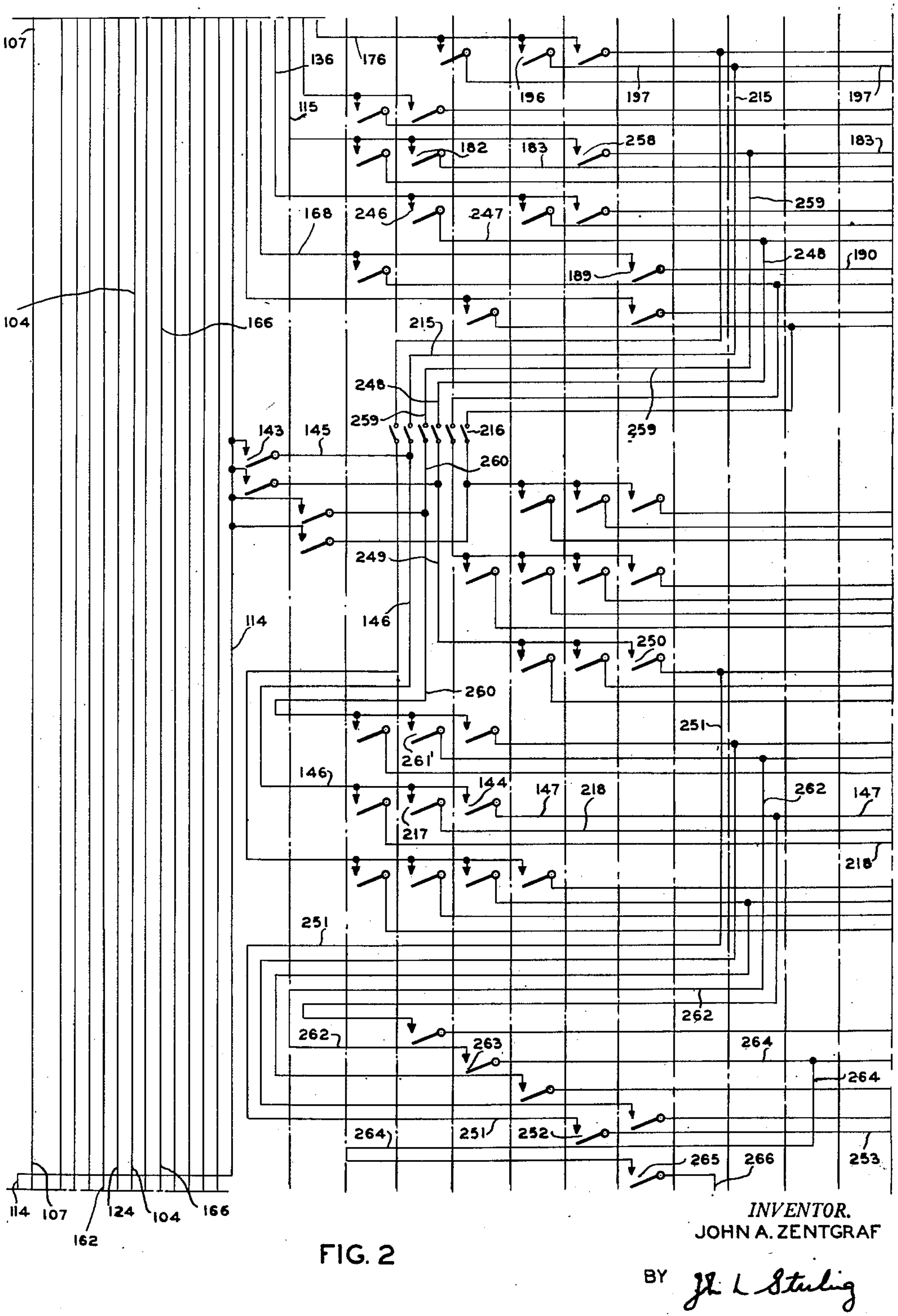
Figure 3:
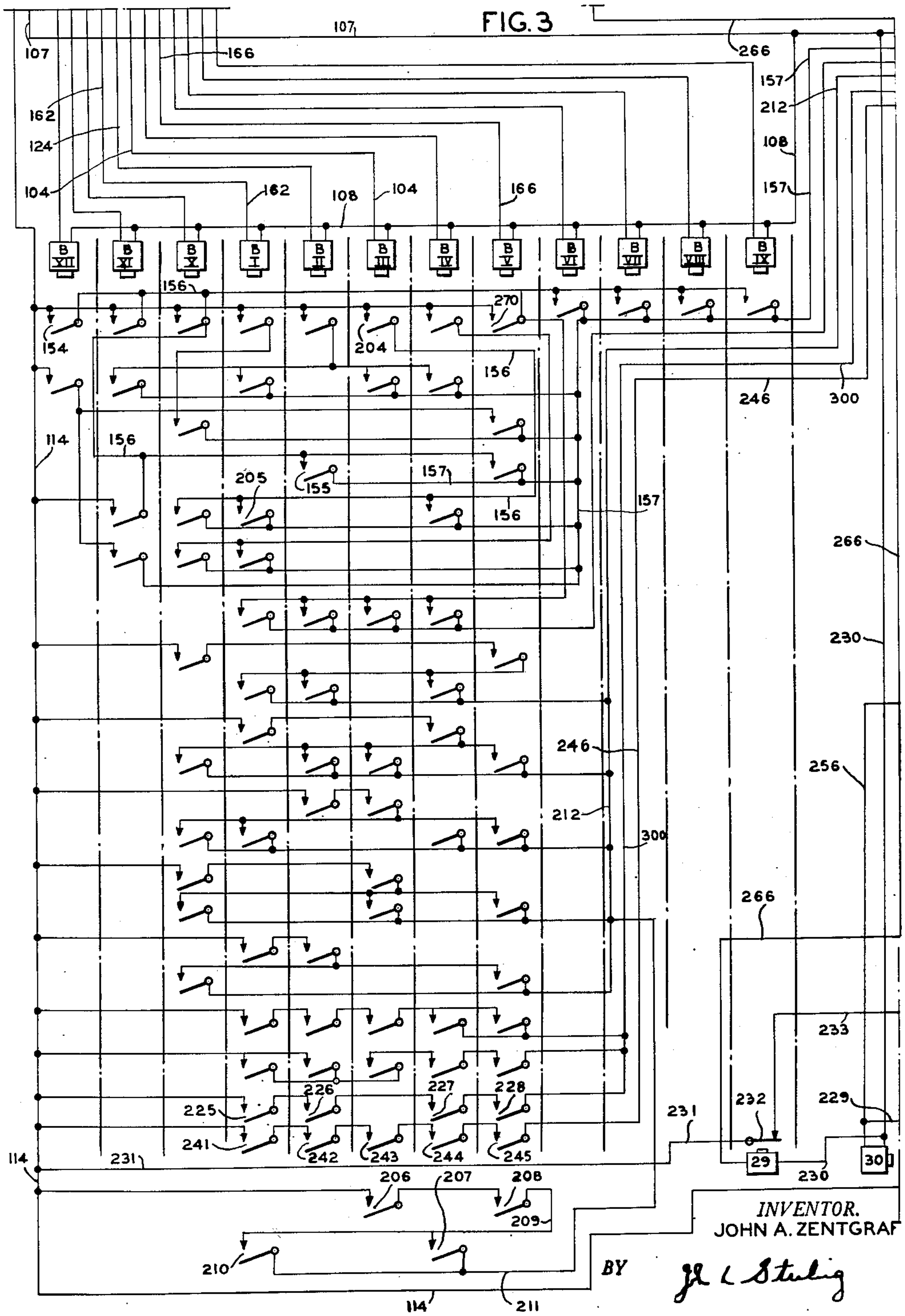
Figures 4, 10:
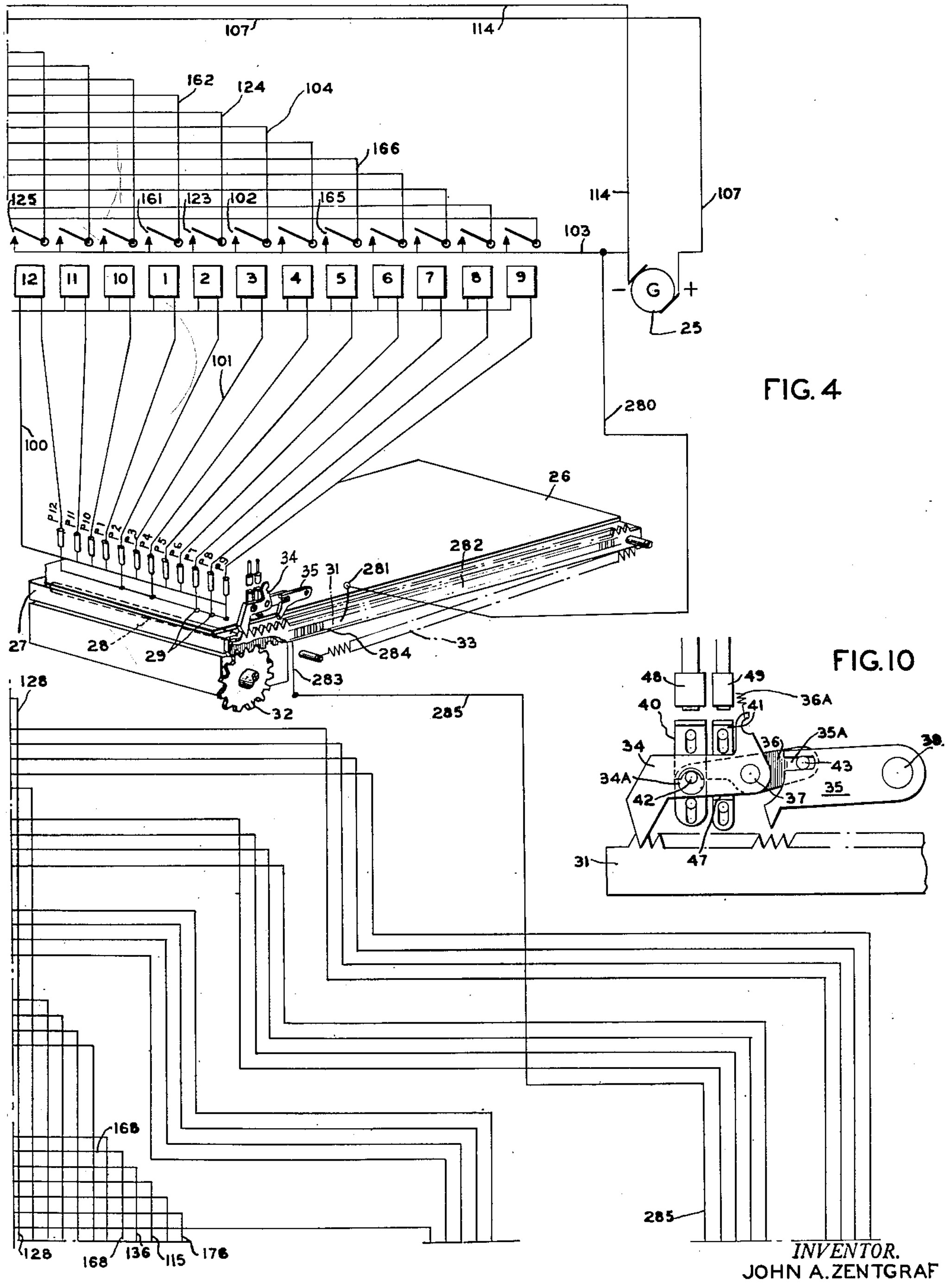
Fig. 10 is an enlarged detail view of the carriage escapement mechanism shown in Fig. 4.

The card sensing mechanism shown in Fig. 4 is for illustrative purposes only, as any conventional step-by-step sensing mechanism could be similarly employed. The illustrated mechanism consists of a movable card carriage 27 having a rack 31 secured thereto. A suitable escapement mechanism is employed in the movement of the carriage 27. The escapement mechanism used herein and later described in detail, when actuated, permits the carriage 27 carrying a card 26 to travel leftward in a step-by-step manner under the influence of a spring 33.

A gear 32, driven by conventional means restores carriage 27 to its extreme right-hand position at the completion of each card sensing operation in preparation for the sensing of the succeeding card. A light 28 is positioned under the carriage 27 so as to present a source of light limited to one card column in width and twelve rows in length. Located above the card 26 and in a plane parallel to the light source 28 are a plurality of photoelectric cells, P1 to P12, each of which is aligned with a corresponding row in the column being sensed. In operation the light source 28 and the photocells P1 to P12 remain stationary while the carriage 27 passes between them. The progressive step-by-step advancement of the card 26 results in the energizing of those photoelectric cells that are exposed to the light emitted through the code perforated card. As will be apparent hereinafter, the energized photoelectroc cells will actuate related relays. For the purpose of simplifying the illustration, the phototube signal voltage amplifying means usually associated with such photoelectric cells have been omitted, it being deemed sufficient to show sensitive relays which are responsive to the flow of the current generated by the energized cell and to refer to the Patents 2,224,761 and 2,224,762 for an explanation of their use in a card handling machine.

Figures 7, 9, 12:
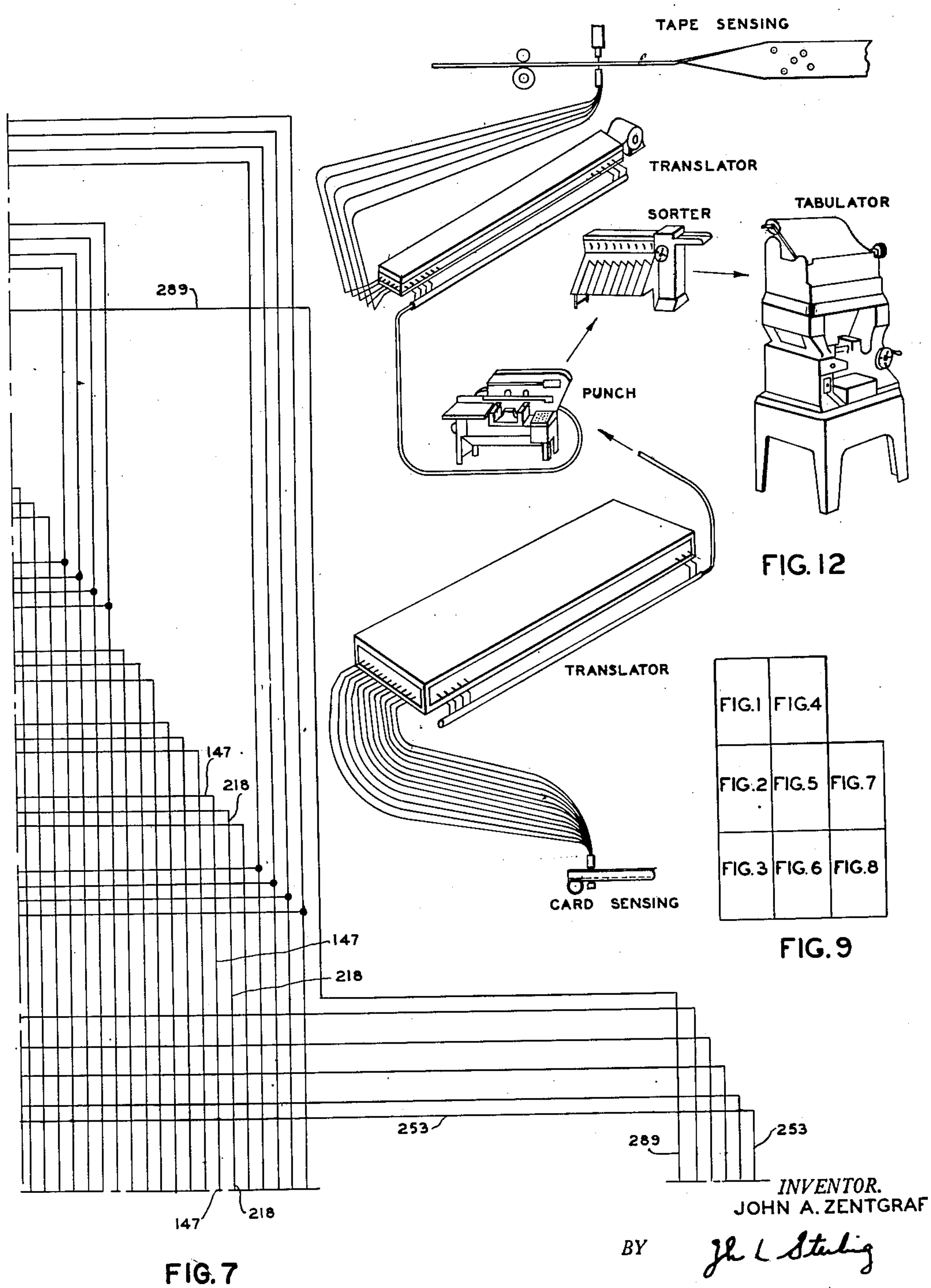
Fig. 9 is a block diagram illustrating the composite layout of Figs. 1 to 8, inclusive.
Fig. 12 is a flow chart showing two applications of the invention along with the card punching, sorting, and tabulating machines associated therewith.
Figure 8:
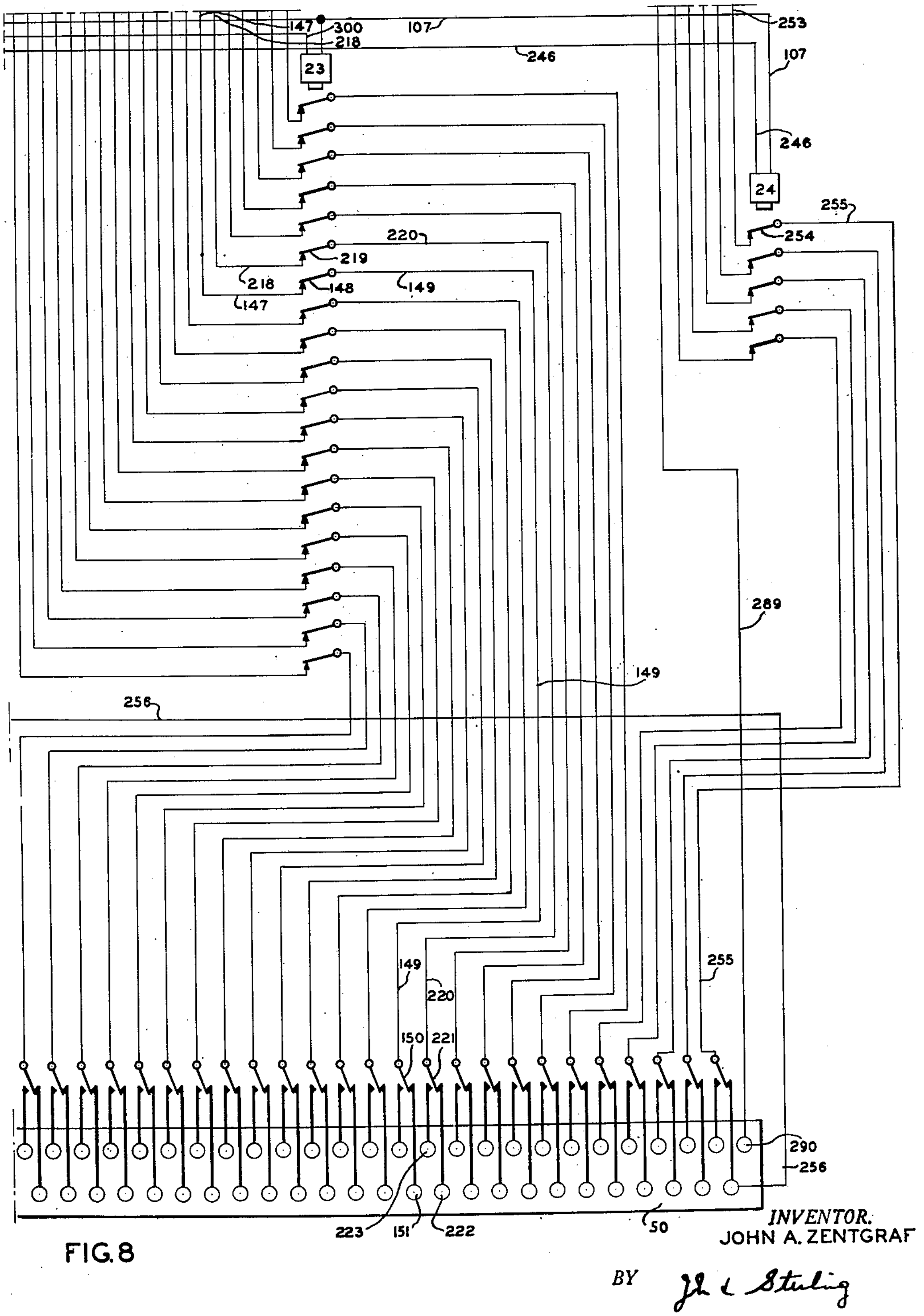

Other methods of sensing may be used (see Fig. 12) since it is obvious that the only requirement necessary is that relays 1 to 12, inclusive, be energized in accordance with the particular type of sensing mechanism employed.

To effect the step-by-step advance of card 26 (Fig. 4), carriage 27 has attached thereto a spring 33 urging said carriage leftward. A suitable escapement mechanism consisting of a rack 31 fast on carriage 27, and pawls 34, 35 cooperating therewith, controls the leftward advancement of carriage 27. As shown in Fig. 10, holding pawl 34 is engaged with the teeth of rack 31 preventing movement thereof. To permit the escape of carriage 27, a solenoid 48 when energized attracts an armature member 40 which is slidably connected to a pawl 34 by a stud 42 extending through an aperture 34*a* in said pawl. The upward movement of member 40 effects a clockwise rotation of pawl 34 which is pivotally mounted on a stud 37, and releases pawl 34 from engagement with rack 31. A lever 36 engaging stud 42 is loosely pivoted on stud 37 and has a pin 43 acting in an open ended slot 35*a* in pawl 35. With the clockwise movement of pawl 34 lever 36 is turned clockwise whereby pin 43 simultaneously effects a counter-clockwise rotation of pawl 35, pivotally mounted on a stud 38, to engage rack 31. The movement is such that rack 31 is permitted to move leftward one columnar space between the disengagement of pawl 34 and the engagement of pawl 35. The deenergizing of solenoid 48 permits a spring 36*a* to urge pawl 34 counter-clockwise. With this movement member 40 is urged downward and pawl 34 engages rack 31. At the same time pawl 35 is returned to ineffective position. Thus, the solenoid 48 controls the column-by-column advancement of carriage 27.

To provide for disengagement of both pawls 34 and 35, as would be required during the return of carriage 27 to its starting position, a second solenoid 49 is energized attracting thereto a similarly constructed, slidable armature member 41. The latter has a lip 47 underlying the pawl 34 below and slightly to the left of the pivot 37. Upward movement of member 41 raises the pawl 34 out of engagement with rack 31 without effecting pawl 35 already disengaged from rack 31.

Solenoids 48 and 49 controlled by circuits, not shown, are responsive to operational movements within the particular business machine that is under control of the invention, i. e., the completion of a character translation would actuate solenoid 48 permitting the carriage 27 to advance one space, presenting the succeeding column to the sensing mechanism, and the completion of a reproduced card effects the actuation of solenoid 49. The methods of doing the above are of a simple nature and are well known to those skilled in the art.

*Translating mechanism*

Generally, the invention as shown in Figs. 1 to 8, inclusive, consists of a plurality of dual contact relays 1 to 12, responsive to the energization of photoelectric cells P1 to P12; a plurality of delayed action relays I to XII (Fig. 1) energized by the actuation of said dual contact relays 1 to 12 (Fig. 4) for establishing a plurality of combinational circuits; a plurality of relays BI to BXII (Fig. 3) energized simultaneously by the actuation of the dual contact relays 1 to 12, rapidly effective for disabling all but one of the combinational circuits prior to the actuation of the said relays I to XII, and a terminal strip 50 (Fig. 11) to which external machines that are to be controlled can be connected.

As will be later described in detail, the sensing of a perforation 29 in a card 26, actuates a photoelectric cell, one of the plurality P1 to P12, energizing the related relay of the group 1 to 12, which in turn energizes a related relay in each of the groups I to XII and BI to BXII. There will be then established one circuit that terminates on a predetermined terminal post on strip 50. In effect, this established circuit permits voltage from a generator 25 to be present at the predetermined terminal post. The supply of voltage is utilized by means of external conductors which connect the said terminal post with a controlling mechanism in the particular business machine that is to be controlled by the decoding unit (see Fig. 12). The aforementioned controlling mechanism is responsive to the supplied electrical voltage and a machine operation results. The established circuit simulates the closing of a switch, or by analogy a pair of contacts, or the depressing of a key in a keyboard operated machine.

As an example of the above, a code translation can be made to occur where the sensed card is perforated in the Powers 45 column code and the machine being controlled is the automatic key punch disclosed in Patent 2,124,178, which is a 90 column code punch. The alphabetical or numerical digit sensed in the 45 column code would be reproduced as the same digit in the 90 column code. Likewise, a translation can be made from an 80 column card to a 90 column card, or vice versa; or from a 45 column card to an 80 column card, etc.

A further example would be the sensing of the coded number "three," a single perforation in the third position, as represented in the Powers 45 column code. In the sensing of this number light will pass through the single perforation to actuate photoelectric cell P3 (Fig. 4) and to initiate the following circuits.

By means of conductors 100, 101 current generated from photocell P3, energizes sensitive relay 3, closing contacts 102. Contacts 102 complete a circuit (see Figs. 1 and 4) from the negative pole of generator 25, through conductor 103, closed contacts 102, conductors 104, 105, the coil of relay III, conductors 106, 107 to the positive pole of generator 25, thus energizing relay III. Simultaneously, a second circuit is established from the negative pole of generator 25, through conductor 103, closed contacts 102, conductors 104 (Figs. 1, 2, 3, and 4), the coil of relay BIII, conductors 108, 107 to the positive pole of generator 25, thus energizing relay BIII. The circuits established by the many contacts closed by the energizing of relay BIII will be hereinafter described.

The now energized relay III effects the closing of several pairs of contacts (Figs. 1 and 2), of which one pair 112 completes a circuit from the negative terminal post 113 on strip 50 (Fig. 6) through conductor 114 (Figs. 1, 2 and 3) contacts 112, conductor 115 (Figs. 4, 5 and 6), normally closed contacts 116, which are controlled by the single code blocking relay 21 hereinafter described, then through conductor 117 to one of the plurality of swinging contacts on an "alpha-numeric" multiple contact relay 30 (Figs. 3 and 6), through the right-hand contact of pair 118 of said plurality and then to terminal post 119, thus providing a usable voltage on terminal post 119. In the present instance, the voltage present on post 119 energizes a relay, not shown, that is integral with the number "3" punching circuit in Lasker's key punch resulting in the punching of perforations representative of the number "3" in a card using the 90 column code.

As will be hereinafter apparent, the remaining pairs of contacts closed by the energized relay III do not establish completed circuits between negative post 113 and any of the other terminal posts on strip 50.

Likewise, relay BIII is energized simultaneously with relay III. However, this is an idle function since the sensed number "3" was represented by a single perforation in the 45 column code, and no blocking circuits are completed thereby.

To explain the use of the single code blocking relay 21, a further illustration would be the sensing of an alphabetical character represented by two perforations in the 45 column code, such as the letter "P." In this instance, the card being sensed would have in a single column, a perforation in row "12" and a perforation in row "2." Therefore, the light at 28 would activate photocells P12 and P2, energizing the related sensitive relays 12 and 2. Contacts 123, closed by sensitive relay 2, establish circuits that energize relays II and BII as follows:

From the negative pole of generator 25 through conductor 103, closed contacts 123, conductors 124, $125^1$, the coil of relay II, conductors 106, 107, to the positive pole of generator 25, thus energizing relay II.

Relay BII is energized as follows:

From negative pole of generator 25, conductor 103, closed contacts 123, conductor 124, coil of relay BII, conductors 108, 107, to the positive pole of generator 25.

Sensitive relay 12 closes contacts 125, establishing circuits similar to the hereinbefore described circuits that energize relays XII and BXIII.

There are now two groups of contacts closed by relays XII and II, and two groups by relays BXII and BII. Of the pairs of contacts closed by relay XII, pair 126 establishes a circuit from the negative post 113 on strip 50, through conductor 114, closed contacts 126, conductors 127, 128, contacts 129, conductor 130, contacts 131, to post 132 on strip 50.

Analogously, relay II closes a pair of contacts 135 establishing a circuit from negative terminal post 113 on strip 50, over conductor 114, through contacts 135, conductor 136, contacts 137, conductor 138, contacts 139, to the terminal post 140 on strip 50.

To avoid duplication of contacts, a manually operated, six pole, single throw switch 216 is normally opened in all translations, except those involving the printing telegraph code. In translating from the 45 column code to other codes, the circuit for the letter "M," as represented by perforations in rows 12 and 11, is the only circuit that passes through contacts controlled by the blocking relay 22 (see Fig. 6).

A third circuit is established in combination with a pair of closed contacts 143 in the XII group, and a pair of closed contacts 144 in the II group. From negative post 113 on strip 50, through conductor 114, closed contacts 143, conductors 145, 146, closed contacts 144, conductor 147, contacts 148, conductor 149, contacts 150, to terminal post 151 on strip 50.

Obviously, the simultaneous presence of a voltage on three posts on strip 50 is undesirable since the voltage on one post could be utilized to initiate the operation necessary to punch the 90 column code equivalent of the letter "P" in a card by the related mechanism in the cited Lasker key punch.

It is, therefore, necessary to eliminate the voltage from two posts and this is accomplished by the action of the blocking relay 21.

As was hereinbefore recited, simultaneously with the energizing of relays XII and II, relays BXII and BII were energized. The XII to I relay group are slug capped and therefore act slower than the relays in group BXII to BI, permitting the blocking relays to be energized before the translating circuits are established. Of the plurality of contacts closed by the energizing of relay BXII, one pair 154 prepares a circuit to be completed by pair 155 of the BII group as follows:

From negative pole of generator 25, through conductor 114, contacts 154, conductor 156, contacts 155, conductor 157, the coil of blocking relay 21, conductors 158, 107, to the positive pole of generator 25, thus energizing blocking relay 21. The group of contacts actuated by the blocking relay 21 are all of the normally closed type. Therefore, the energizing of relay 21 opens all contacts including pairs 129 and 137, thereby preventing the presence of voltage potential on terminal posts 132 and 140.

The remainder of the contacts closed by relays BXII and BII do not establish any circuits. The blocking relay 23 remains undisturbed and the desired voltage potential is available on post 151 of strip 50.

A further example of translation occurs where the card being sensed is perforated in the Powers 90 column code. This code consists of one, two, or three hole combinations which may be perforated in both the upper and lower zones of the card, each zone presenting 45 vertical columns of six data index positions per column.

The letter "A," as represented in the 90 column code, is a three hole code combination. The perforations are located in the 2nd, 4th, and 6th index positions of a single column. Therefore, photocells P1, P3, and P5 will actuate sensitive relays 1, 3, and 5, when light from light source 28 passes through the said second, fourth, and sixth perforated rows. There now exists conditions similar to those present in the hereinbefore recited examples of operation, i. e., sensitive relays 1, 3, and 5 close contacts, which indirectly establish several separate circuits in addition to the single desired circuit, resulting from the combination of the contacts closed, as will be apparent from the following description.

The energizing of sensitive relay 1 closes contacts 161 establishing circuits that energize relays I and BI, as follows: from negative pole of generator 25, through conductor 103, closed contacts 161, conductors 162, 163, the coil of relay I, conductors 106, 107, to the positive pole of generator 25. Analogously, relay BI is energized by a circuit from the negative pole of generator 25, through conductor 103, closed contacts 161, conductor 162, the coil of relay BI, and the conductors 108, 107 to the positive pole of generator 25.

Sensitive relay 3, when energized, closes contacts 102, completing the circuits that energized relays III and BIII, as hereinbefore recited.

Sensitive relay 5, when energized, closes contacts 165, establishes a circuit that energizes relay V, including the negative pole of generator 25, conductor 103, closed contacts 165, conductors 166, 167, the coil of relay V, conductors 106, 107, and the positive pole of generator 25. Simultaneously, relay BV is energized by the following circuit: from the negative pole of generator 25, through conductor 103, contacts 165, conductor 166, the coil of relay BV, conductors 108, 107, and to the positive pole of generator 25.

It is apparent, therefore, that several groups of contacts are closed by the energizing of relays I, III and V and that several undesirable circuits are prepared and exist as follows:

From negative terminal post 113, through conductor 114, contacts 167[1], conductor 168, contacts 169, conductor 170, contacts 171, to terminal post 172.

A second circuit, from negative terminal post 113, through conductor 114, contacts 175, conductor 176, contacts 177, conductor 178, contacts 179 to terminal post 180.

A third circuit, hereinbefore described, from negative post 113 to terminal post 119 on strip 50.

A fourth circuit from negative terminal post 113, conductor 114, contacts 112, conductor 115, left of junction, contacts 182, conductor 183, contacts 184, conductor 185, contacts 186, to terminal post 187.

A fifth circuit from negative terminal post 113, through conductor 114, contacts 167[1], conductor 168, left of junction, contacts 189, conductor 190, contacts 191, conductor 192, contacts 193 to terminal post 194.

A sixth circuit from negative terminal post 113 through conductor 114, contacts 175, conductor 176, left of junction, contacts 196, conductors 197, 198, contacts 199, conductor 200, contacts 201, to terminal post 202.

The six circuits listed above are ancillary circuits resulting from the combination of the energizing of relays I, III, and V, and are undesirable for this particular translation, therefore, must be broken or disabled. The relays BI, BIII, and BV, now energized, provide combination circuits that permit blocking relays 21, 22 to be energized, thereby opening the said undesirable circuits as follows:

From the negative pole of generator 25, through conductor 114, contacts 204, conductor 156, contacts 205, conductor 157, the coil of blocking relay 21, conductors 158, 107, to positive pole of generator 25, thus energizing the single code blocking relay 21 and opening the contacts controlled thereby.

The double code blocking relay 22, is energized by a similar circuit as follows:

From the negative pole of generator 25, through conductor 114, closed contacts 206, of the BIII relay group, conductor 207, contacts 208 of the BV relay group, conductor 209, contacts 210 of the BI relay group, conductors 211, 212, the coil of blocking relay 22, conductors 213, 107 to the positive pole of generator 25. The then energized blocking relay 22, opens all possible dual code combination circuits resulting from the sensing of a three hole code character.

With the removal of the undesirable ancillary circuits, there remains one circuit which is used to initiate the related operation of the external machine being controlled, i. e., reproduce the letter "A" in a different code. The desired circuit is as follows:

From negative terminal post 113, through conductor 114, contacts 175 of the V relay group, conductor 176, left of junction, contacts 196 of the III relay group, conductors 197, 215, normally opened and now closed contacts of switch 216, conductor 146, contacts 217 of the I relay group, conductor 218, closed contacts 219 of the blocking relay 23 group, conductor 220, contacts 221, to post 222 on strip 50.

A still further illustration of the invention is the application of translating a 90 column code character into the same character in the Baudot or printing telegraph code. It is to be understood that the 90 column code was chosen to facilitate the illustration and any of the other codes could be similarly employed.

The printing telegraph code consists of many duplicated signals, that is, the code combinations for "letters" are the same for "numbers" and are differentiated between by the use of a shift-unshift code combination preceding the changing letter or number.

Therefore when card-to-direct transmission, or the preferred card-to-tape, is desired, means for interpolating must be provided, i. e., means must be provided whereby the shift-unshift 1–2–4–5 or 1–2–3–4–5 signal is automatically punched in the tape, or in direct transmission, is sent preceding the character. Briefly, the sensing of a number following a letter requires that the 1–2–4–5 shift signal be perforated in the tape prior to the perforation of the number character, and where a letter follows a number the 1–2–3–4–5 signal is used. The 1–2–4–5 or 1–2–3–4–5 signal conditions the printing telegraph equipment for correct interpolation of the subsequent character. This requires that the circuit controlling the escapement of carriage 27 be disabled for one cycle of the tape perforating machine. This is accomplished by a simple means consisting of a pair of contacts 287, 288 in series with an external circuit controlled by the shift mechanism of the printing telegraph equipment. The printing telegraph shift mechanism may be actuated by a single electrical pulse present on one of the terminal posts on strip 50 with the control mechanism connected thereto. Therefore, the present invention provides a method for automatically distinguishing between letters and numbers.

Figure 5:
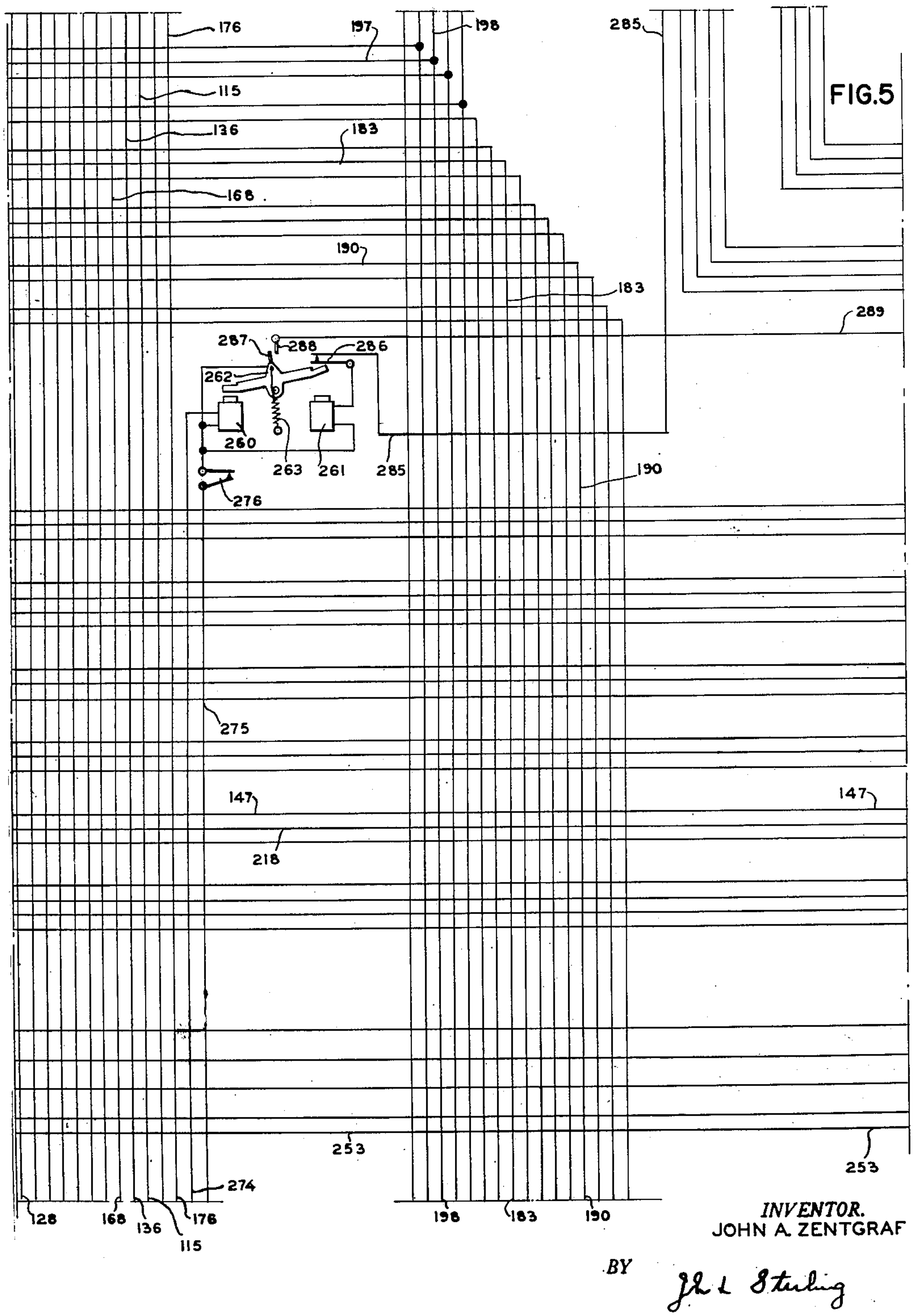
Figure 6:
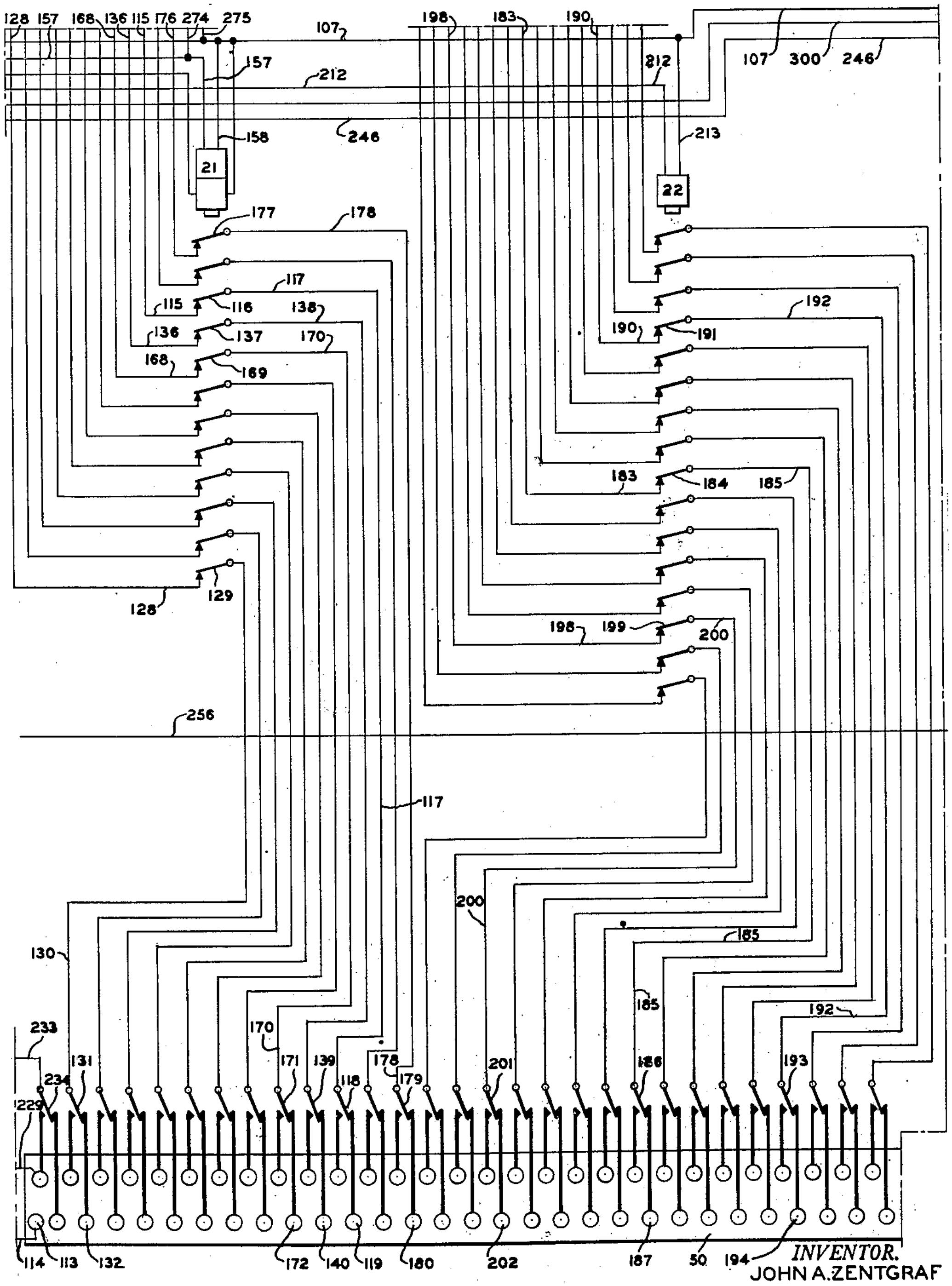

The mechanism for automatic interpolation consists essentially of a device having a pair of solenoids 260 and 261, and a common armature 262, as shown in Fig. 5. Armature 262 centrally pivoted has a snap or toggle action by means of an over-center spring 263. Carried by armature 262 is a travelling contact 287, one of a pair which brushes momentarily against the second contact 288 of said pair, as will be hereinafter described. Employing the letter A, 90 column code for illustrative purposes, the circuits for operating the said interpolating device are as follows:

Solenoid 260 is energized by a circuit originating at the negative pole of generator 25, through conductor 114, contacts 204, closed by the energized BIII relay, conductor 156, contacts 205 of the BI relay group, conductors 157, 274, the coil of solenoid 260, closed switch 276, conductors 275, 107, to the positive pole of generator 25.

Since all alphabetical representations in the Powers 90 column code consist of two or three hole code combinations, solenoid 260 will be energized each time an alphabetical sensing occurs.

Solenoid 261 may be termed "the numerical solenoid" in that the said solenoid is effective only when a numerical representation is sensed. The term "effective" is not to be confused with the term "energized" as it will be apparent from the following circuit that solenoid 261 is energized simultaneously with each alphabetical sensing, and the first sensing of any numerical series.

From the negative pole of generator 25 (Figs. 4 and 5) a circuit is completed through conductor 280, brush 281, commutator 282, commutator segments 284, brush 283, conductor 285, closed contacts 286, the coil of solenoid 261, closed switch 276, conductors 275, 107, to the positive pole of generator 25, thus energizing solenoid 261.

Commutator 282, mounted on but insulated from carriage rack bar 31, is constantly engaged by brush 281. Therefore, negative potential is ever present thereon. Commutator segments 284 are aligned with the corresponding columns of a card, i. e., as card 26 advances to present a new column to the sensing device, brush 283 contacts the corresponding commutator segment 284. The making and breaking of brush 283 with commutator segments 284 pulses solenoid 261 synchronously with the sensing of the coded perforations in a column.

Assuming that the column preceding the one containing the letter "A" was an alphabetical representation, the armature 262 of the interpolating device is positioned counter-clockwise. The sensing of the letter "A," as hereinbefore recited, energizes solenoid 260 and simultaneously solenoid 261 is energized. However, the left arm of armature 262 is in close proximity to solenoid 260 and therefore, armature 262 does not move.

Continuing the example, assuming that the next column sensed contains coded perforations representative of a number, solenoid 260 will not be energized. Therefore, the energizing of solenoid 261 will attract armature 262 thereto, rotating said armature clockwise. Spring contact 287 secured to armature 262 wipes contact 288 momentarily as the said armature rocks clockwise or counter-clockwise. Similarly, as armature 262 rocks clockwise in this instance, spring contacts 286 open, disabling the energizing circuit for solenoid 261, but, not until armature 262 has travelled sufficiently to enable toggle spring 263 to complete the clockwise movement thereof.

The wiping action of contact 287 against contact 288 momentarily establishes a circuit from the negative terminal pole of generator 25, through conductor 114, to terminal post 113 on strip 50 and from the positive pole of generator 25, through conductors 107, 275, closed switch 276, contacts 287, 288 and conductor 289 to terminal post 290. The mechanism in the printing telegraph equipment, not shown, for interpolating is under control of a relay, the coil of which would be connected to post 113 and post 290 on strip 50.

In the sensing of the subsequent columns, the said interpolating device remains inactive until an alphabetical representation is sensed and solenoid 260 is energized. Armature 262 will rock counter-clockwise, contacts 287, 288 will be momentarily engaged, effecting a related change in the printing telegraph equipment, and contacts 286 will be closed preparing solenoid 261 for all subsequent sensing.

Reversing this procedure, if a tape perforated in the printing telegraph code is being sensed and a card is to be reproduced in the 90 column code, the alpha-numeric relay 30 would then be employed.

In sensing printing telegraph tape, the photocells P1, P2, P3, P4, and P5 are used. For simplicity of illustration, sensitive relays 1, 3, and 5 were actuated in the hereinbefore described operation of sensing the letter "A," 90 column code, and the related relays I, III, V and BI, BIII, and BV provided one circuit to post 222 of strip 50. Utilizing the same circuit, the sensing of the letter "Y" as represented by perforations in the first, third and fifth rows of the tape, will result in voltage being present on post 232, provided, however, that the preceding signal on the tape was alphabetical. If the numerical equivalent of the letter "Y" is sensed, the number 6 as represented by the same code combinations, the intermediate shift signal 1-2-4-5 code combination would be present in the tape and would precede the 1-3-5 code combination. To interpolate, it is then necessary that relay 30 be actuated and the swinger arm of pair 221, swing leftward contacting the left-hand contact of pair 221, resulting in the usable voltage being switched to post 223. The mechanism in the external machine for reproducing the number "6" in 90 column code would be connected to post 223, and for reproducing the letter "Y" to post 222.

The circuit for actuating relay 30 is as follows:

From the negative pole of generator 25, through conductor 114, contacts 135, conductor 136, left of the junction, contacts $246^1$, conductors 247, 248, normally opened and now closed switch 216, conductor 249, contacts 250, conductor 251, contacts 252, conductor 253, contacts 254, conductors 255, 256, the coil of relay 30, conductors 230, and 107 to the positive pole of generator 25, thus the energizing of relays I, II, IV and V provides a means for energizing the relay 30. A holding circuit is established for relay 30 by means of a conductor 114 from the negative pole of generator 25, conductor 231, closed contacts 232, conductor 233, the swinger and left-hand contact of pair 234, conductor 229, the coil of relay 30, conductors 230, 107 to the positive pole of the generator 25. Therefore, relay 30 remains energized and all swinger arms are contacting the left-hand contacts of their related pairs. This condition exists until a "letters" signal is sensed and relays I, II, III, IV and V are energized, closing contacts 112, 258, 261[1], 263, 265, establishing a circuit as follows:

From the negative pole of generator 25, through conductor 114, contacts 112, conductor 115, left of junction contacts 258, conductor 259, closed switch 216, conductor 260, contacts 261[1], conductor 262, contacts 263, conductor 264, contacts 265, conductor 266, the coil of relay 29, conductors 230, 107 to the positive pole of generator 25, thus energizing relay 29 which opens contacts 232, breaking the holding circuit for relay 30. The swinger arms of all the pairs of contacts under control of relay 30 then return to their respective right-hand positions which couples the "letter" terminal posts to the translating circuits.

The numerical four hole, 1–2–4–5, shift signal in the printing telegraph tape would provide many ancillary circuits of single, double, and triple code combinations. Therefore, blocking relays 21, 22, and 23 are energized in a manner similar to that in the hereinbefore described examples. The circuit for controlling relay 23 is as follows:

From the negative pole of generator 25, through conductor 114, closed contacts 225, 226, 227, and 228, conductor 300, coil of relay 23, conductor 107 to the positive pole of generator 25, thus energizing relay 23.

The alphabetical five hole-unshift-signal, as represented by 1–2–3–4–5 in the printing telegraph tape, would likewise provide many ancillary circuits of single, double, triple, and quadruple code combinations. Therefore, it is necessary that blocking relays 21, 22, 23 and 24 be energized. The circuit controlling relay 24 is as follows:

From the negative pole of generator 25 through conductor 114, closed contacts 241, 242, 243, 244, and 245, conductor 246, the coil of blocking relay 24, conductor 107 to the positive pole of generator 25, thus energizing relay 24.

The energizing of blocking relays 21, 22, 23, and 24 disables all circuits leading to the terminal strip 50, thereby preventing any operation from occurring in the external machine. In addition, since contacts 254 are open, the hereinbefore described initial circuit for energizing relay 30 is incomplete, this being necessary due to the letters shift-signal 1–2–3–4–5 also including therein the numbers shift-signal 1–2–4–5.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a device of the class described for selecting a single circuit by decoding record cards bearing designations in the form of one or more code perforations arranged in a single card column, sensing means including a light source common to all of the perforations of a card column, a set of photoelectric cells, each individual to a particular perforation of the card column and responsive to light emitted through such perforation, a plurality of relays having pluralities of contacts thereon, a second plurality of multi-contact relays in parallel circuits with said first plurality of relays, said first and second pluralities of relays responsive to said cells, a plurality of circuits established by the selective energizing of a plurality of said first plurality of relays, and means responsive to circuits established by said second plurality of multi-contact relays for disabling all but one of said plurality of circuits.

2. In a device of the class described for selecting a single circuit by decoding record card bearing designations in the form of one or more code perforations arranged in a single card column, sensing means including a light source common to all of the perforations of a card column, a set of photoelectric cells, each individual to a particular perforation of the card column and responsive to light emitted through such perforation, a first and second plurality of multi-contact relays responsive to said cells, a plurality of circuits established by the energizing of said first plurality of multi-contact relays, and a plurality of blocking relays responsive to circuits established by the energizing of said second plurality of multi-contact relays for disabling all but one of said plurality of circuits established by said first plurality of multi-contact relays.

3. In a device of the class described for selecting a single circuit by decoding record cards bearing designations in the form of one or more code perforations arranged in a single card column, sensing means including a light source common to all of the perforations of a card column, a set of photoelectric cells, each individual to a particular perforation of the card column and responsive to light emitted through such perforation, a first and second plurality of multi-contact relays responsive to said cells, a plurality of circuits established by the energizing of said first plurality of multi-contact relays, a terminal strip for said established circuits, and a plurality of blocking relays responsive to circuits established by the energizing of said second plurality of multi-contact relays for disabling all but one of said plurality of circuits established by said first plurality of multi-contact relays.

4. In a device of the class described for selecting a single circuit by decoding record cards bearing designations in the form of one or more code perforations arranged in a single card column, sensing means including a light source common to all of the perforations of a card column, a set of photoelectric cells, each individual to a particular perforation of the card column and responsive to light emitted through such perforation, a plurality of sensitive relays responsive to said photoelectric cells, a plurality of slow-operating relays, a plurality of fast operating relays, said pluralities of slow and fast operating relays responsive to the energizing of said plurality of sensitive relays, a plurality of circuits established by the energizing of said plurality of slow-operating relays, a terminal strip therefor, and a plurality of circuit blocking relays responsive to circuits established by said plurality of fast-operating relays for disabling all but one of said plurality of circuits established by said slow-operating relays.

5. In the combination of a device for decoding printing telegraph tape perforated according to a five unit code including a shift code signal before each upper case character with a machine for reproducing the same character in a record card according to a different code, a sensing mechanism including a light source common to all the code perforations of a particular character, a plurality of photoelectric cells each individual to a particular perforation and responsive to the source of light emitted through the perforation, an escapement mechanism for moving the tape character by character over the light source, a plurality of sensing relays actuated by the reproducing machine for controlling such movements, a plurality of slow operating relays and a plurality of fast operating relays, both responsive to the energizations of the photoelectric cells during the sensing of the shift code signal, a plurality of circuits initiated by the slow acting relays, a terminal strip connected to external circuits, character shift code signal means operable momentarily by a circuit established by the fast operating relays, a plurality of relays energized by the fast action relays for blocking the establishment of any circuits to the terminal strip initiated by the slow acting relays during sensing of the shift signal code and circuits from the terminal strip serving to connect the established circuit to the escapement relay controlling mechanism of the reproducing machine.

6. In a translating device for selecting a single circuit from a number of circuits controlled by record cards bearing designations in the form of one or more code perforations arranged in a single card column for actuating an external machine by the selected circuit, a sensing mechanism including a light source common to all of the perforations of a card column, a set of photoelectrical cells each individual to a particular perforation of the card and responsive to the source of light emitted through its related card perforation, a first set of slow acting relays, each individual to a particular photoelectric cell and energizable upon the response of its related photo-cell, a second set of fast acting relays in parallel with the first set of relays, each relay for the second set being also energizable by a particular photo cell, a plurality of blocking relays energizable by the energized fast acting relays, a plurality of circuits established by the energization of the slow acting relays, certain of the blocking relays when energized by the fast acting relays serving to disable all but one of the circuits established by the slow acting relays, and a terminal strip for connecting the latter circuits to another machine.

7. In a translating device controlled by record cards bearing designations in the form of one or more code perforations and not more than twelve arranged in a single card column, means for selecting a single control circuit from a plurality of possible circuits controlled by plural code perforations for operating another machine according to a different code, including sensing means having a light source common to all perforations contained in a card column, a set of twelve photoelectric cells each responsive to light emitted through a particular perforation of a card column, a set of twelve slow operating relays, each energizable by a particular photoelectric cell, a set of twelve fast operating relays in parallel with the first set of relays and each also energizable by a particular photoelectric cell, a plurality of circuits operated by the energization of slow acting relays, a plurality of circuits established by the energizing of fast acting relays prior to the initiation of circuits by the slow acting relays, a plurality of blocking relays energizable by the energized fast acting relay circuits, contact means for the blocking relays with cooperating circuits serving to allow completion of only one of the circuits initiated by the slow acting relays, and means for connecting the completed circuit to external circuits.

8. In a translating device controlled by record cards bearing designations in the form of one or more code perforations arranged in a single card column, means for selecting a single control circuit from a plurality of possible circuits selected by plural code perforations for operating another machine according to a different code which comprises sensing means including a light source common to all perforations contained in a card column, a plurality of photoelectric cells each individual to a particular perforation of card column and responsive to the source of light emitted through its related card perforation, escapement mechanism for moving record cards column by column over the light source for sensing, a set of multi-contact relays, each energizable by a particular photoelectric cell, a second set of multi-contact relays each being energizable by a particular photoelectric cell, a terminal strip for circuits established by the first set of relays, a group of blocking relays energizable by circuits established by the second set of relays, retarding means associated with the first set of relays whereby the second set of relays are sooner energized, the blocking relays upon energization serving to block the establishment of all circuits but one by the first set of relays, the terminal strip serving as a means of carrying the unblocked circuit to an external machine.

9. In a translating device controlled by record cards bearing designations in the form of one or more code perforations arranged in a single card column, means for selecting a single control circuit from a plurality of possible circuits selected by plural code perforations for operating a printing telegraph machine in accordance with a five unit printing telegraph code, a sensing mechanism including a light source common to all of the perforations of a card column, a plurality of photoelectric cells each individual to a particular perforation of the card column and responsive to the source of light emitted through the related card perforation, an escapement mechanism controlled by the printing telegraph machine for moving a record card column by column over the light source for sensing, a plurality of slow operating relays and a plurality of fast operating relays responsive to the energization of the photoelectric cells, a terminal strip for circuits established by the slow acting relays, shift signal relay means operable momentarily by circuits established by the fast operating relays to establish a momentary circuit to the terminal strip prior to the establishment of any circuits thereon by the slow acting relays, the terminal strip serving to connect the momentary circuit to the printing telegraph machine for a control operation of the escapement mechanism.

JOHN A. ZENTGRAF.

REFERENCES CITED

The following references are of record in the file of this patent:

UNITED STATES PATENTS

| Number | Name | Date |
|---|---|---|
| 2,074,423 | Peterman | Mar. 23, 1937 |
| 2,343,405 | Doty | Mar. 7, 1944 |
| 2,370,989 | Nichols | Mar. 6, 1945 |